C. H. BURLINGHAM.
COOKING UTENSIL.
APPLICATION FILED MAY 1, 1919.
1,361,364.
Patented Dec. 7, 1920.
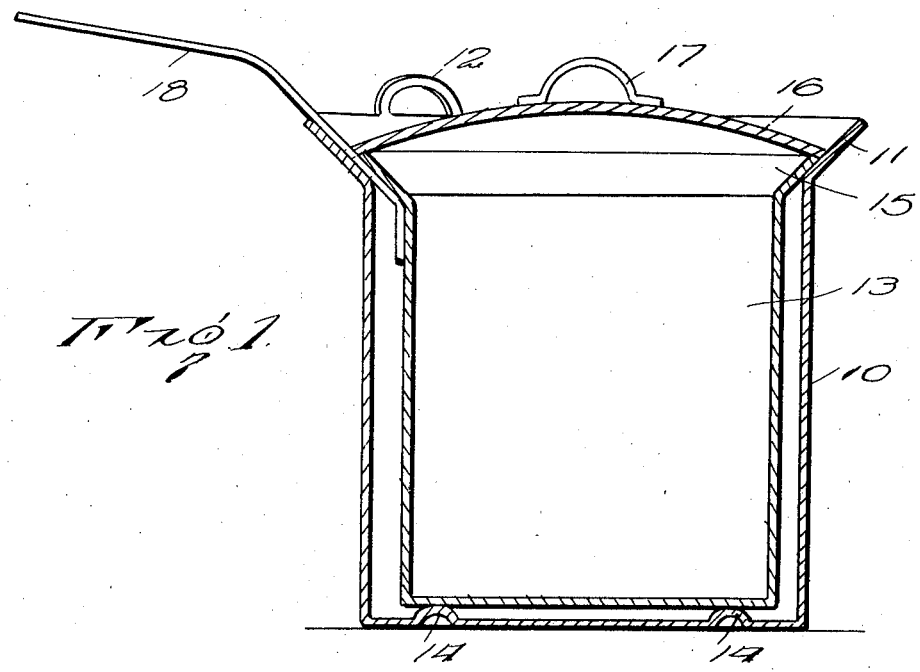
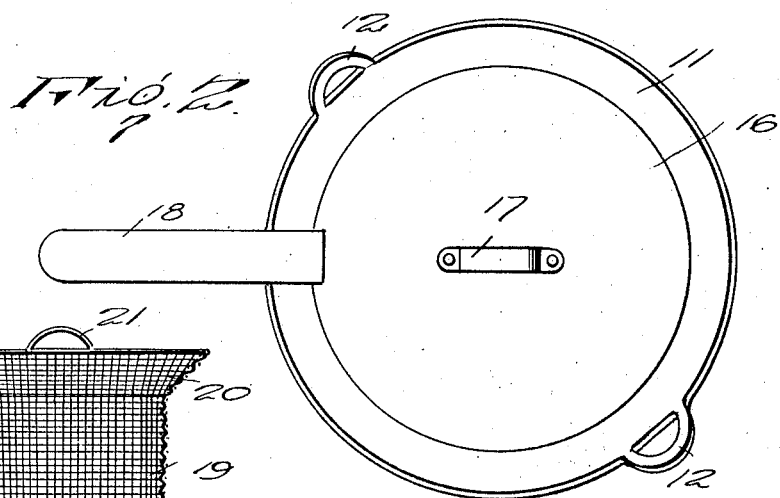
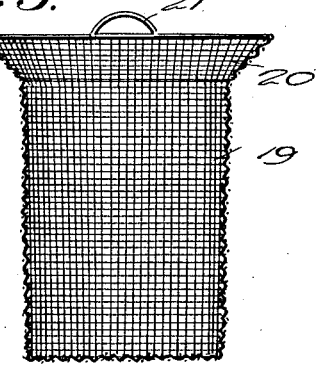
Charles H. Burlingham
Inventor
By Geo. P. Kimmel
Attorney

UNITED STATES PATENT OFFICE.

CHARLES H. BURLINGHAM, OF MANLIUS, NEW YORK.

COOKING UTENSIL.

1,361,364.                    Specification of Letters Patent.        Patented Dec. 7, 1920.

Application filed May 1, 1919. Serial No. 293,924.

*To all whom it may concern:*

Be it known that I, CHARLES H. BURLINGHAM, a citizen of the United States, residing at Manlius, in the county of Onondaga and State of New York, have invented certain new and useful Improvements in Cooking Utensils, of which the following is a specification.

This invention relates to an improved cooking utensil of the double boiler type and the principal object of the invention is to provide a utensil of the character described which is so constructed that the inner receptacle will be centered in the outer receptacle to afford a space between said receptacles to be filled with water so that the inner receptacle will at all times be surrounded by water thereby preventing danger of burning of material placed in the inner receptacle.

Another object of the invention is to so construct this utensil that the inner receptacle will be retained in spaced relation to the bottom of the outer receptacle thus providing for a layer of water between the outer receptacle and the bottom of the inner receptacle to assist in preventing burning of material placed in the inner receptacle.

Another object of the invention is to so construct this utensil that the inner receptacle can be easily and conveniently removed from the outer receptacle without danger of burning the hands.

This invention is illustrated in the accompanying drawings wherein:

Figure 1 is a view showing the improved utensil in vertical section,

Fig. 2 is a top plane view of the improved utensil, and

Fig. 3 is a vertical sectional view through a modified form of the inner receptacle.

This utensil includes an outer water receptacle 10 open at its upper end and having its upper end flared to provide a flared flange-like portion 11 upon opposite sides of which will be provided handles 12 thus permitting the outer receptacle to be easily moved. This receptacle is cylindrical and when the inner receptacle 13 is in place the flared upper portion 11 serves to retain the inner receptacle centered in the outer receptacle. This inner receptacle 13 is also cylindrical and in the form shown in Fig. 1 will be formed of metal with unperforated sides thus providing a receptacle for holding cereals or other substances to be cooked. This inner receptacle rests upon the supports 14 struck up from the bottom of the outer receptacle and will thus be held in spaced relation to the bottom of the outer receptacle thus providing space for water beneath the outer receptacle and preventing danger of the cereals burning. The walls of the inner receptacle are flared to provide a flange 15 which rests upon the flange 11 and as this flange conforms to the angle and contour of the flange 11 it will be readily seen that the inner receptacle will automatically seat itself in the outer receptacle with the walls in spaced relation to the walls of the outer receptacle. This will prevent transverse sliding movement of the inner receptacle which might cause the inner receptacle to move to engagement with the outer receptacle and cause danger of burning in case the water placed in the outer receptacle should all boil away. A cover 16 is provided for the inner receptacle and provided with a handle 17 so that this cover can be easily removed when desired. In order to permit the inner receptacle to be easily removed from the outer receptacle without danger of burning or scalding the hands there has been provided an elongated handle 18 extending beneath the flange 11 and against the wall of the inner receptacle, suitable fasteners being provided to hold the handle in place. In order to permit large articles such as potatoes or the like to be cooked in the outer receptacle and collectively removed and water drained from them there has been provided an inner receptacle 19 which is shown in Fig. 3 and formed of wire woven to assume the proper shape, the walls of the inner receptacle 19 having their upper end portions flared to provide a flange 20 which corresponds to the flange 15 and seats upon the flange 11 thus properly centering the receptacle. This receptacle may be provided with a handle similar to the handle 18 or may be provided upon opposite sides with the handles 21 similar to the handles 12. After the potatoes or other articles have been sufficiently cooked in the boiling water placed in the outer receptacle and of course entering the inner receptacle the inner receptacle can be removed and will carry with it the articles being cooked. The articles can then be left in the inner receptacle until the water has drained from them. It will thus be seen that there has been provided a cooking utensil of the double boiler type in which the inner receptacle may be properly seated in the outer receptacle and retained in the proper position by the action of the flanges 15 and 11 thereby providing a utensil in which the danger of burning caused by the water in the outer receptacle boiling away is eliminated.

What I claim is:

A cooking utensil comprising a cylindrical outer vessel having a flared portion at its upper end and upstruck spacing and supporting elements on its bottom, a similarly shaped inner vessel of smaller diameter than the outer vessel adapted to be seated on said upstruck elements, the upper flared portion of the two vessels coacting to center the inner vessel within the outer vessel with their vertical walls in spaced relation.

In testimony whereof, I affix my signature hereto.

CHARLES H. BURLINGHAM.